United States Patent

Furukawa

[19]

[11] Patent Number: 4,655,635
[45] Date of Patent: Apr. 7, 1987

[54] SAND SCATTERING DEVICE FOR ARTIFICIAL LAWN

[75] Inventor: Genzo Furukawa, Kobe, Japan

[73] Assignee: Sumitomo Gomu Kogyo Kabushiki Kaisha, Hyogo, Japan

[21] Appl. No.: 723,251

[22] Filed: Apr. 15, 1985

[30] Foreign Application Priority Data

Apr. 17, 1984 [JP] Japan .................................. 59-77374

[51] Int. Cl.⁴ ........................................... E01C 19/20
[52] U.S. Cl. ..................................... 404/108; 404/113
[58] Field of Search ................................. 404/101–103, 404/108–110, 113, 128; 15/82, 84; 51/176; 172/30, 33

[56] References Cited

U.S. PATENT DOCUMENTS

| | | | |
|---|---|---|---|
| 1,932,928 | 10/1933 | Frisch | 404/101 |
| 2,258,205 | 10/1941 | Halvorson | 404/103 |
| 2,313,412 | 3/1943 | Wells | 15/82 |
| 2,645,986 | 7/1953 | Rasmussen | 404/103 |
| 2,830,510 | 4/1958 | Mariani et al. | 404/103 |
| 3,526,173 | 9/1970 | Brandstetter et al. | 404/108 |

FOREIGN PATENT DOCUMENTS

| | | | |
|---|---|---|---|
| 38621 | 3/1928 | Denmark | 404/101 |
| 1222095 | 8/1966 | Fed. Rep. of Germany | 404/101 |
| 149244 | 7/1981 | Fed. Rep. of Germany | 404/101 |

*Primary Examiner*—Stephen J. Novosad
*Assistant Examiner*—John F. Letchford
*Attorney, Agent, or Firm*—Robert E. Burns; Emmanuel J. Lobato; Bruce L. Adams

[57] ABSTRACT

A device for scattering and simultaneously filling sand into turf spaces of an artificial lawn spread on a base comprises a truck caused to run on the artificial lawn by a drive source, a hopper mounted on the truck for storing sand, and a rotary brush for filling the turf spaces with the sand discharged from the hopper and scattered on the artificial lawn. The rotary brush is rotatably driven by the drive source of the truck, and vertically movably mounted onto the truck. The rotary brush is supported by coupling members by which the urging force of the brush against the artificial lawn can be adjusted when the rotary brush is positioned upon the artificial lawn.

13 Claims, 5 Drawing Figures

SAND SCATTERING DEVICE FOR ARTIFICIAL LAWN

BACK GROUND OF THE INVENTION

1. Field of the Invention

The present invention relates to a sand scattering device suitable for use in constructing an athletic sports ground of an artificial lawn with its turf spaces filled with sand.

2. Description of the Prior Art

Generally, an artificial lawn is arranged such that flat thready pieces of a synthetic resin material such as polyamide, polyurethane, or the like, are planted, for example, on a liner base cloth. In the case where a sports ground, for example, a soccer or football ground, is constructed by using such an artificial lawn, turf spaces of the artificial lawn are filled up with sand, in order to simulate to a natural lawn as much as possible in various characteristics, such as buffer performance, capability of preventing spikes of spike shoes from being caught, capability of absorbing moisture, and the like. Also in a natural lawn forming a green on a golf course, sand is filled in the turf spaces. In this case, however, the natural turf on a green is low in height and not so dense. Accordingly, the scattered sand substantially spontaneously enters the turf spaces and it is possible to easily and smoothly spread the sand simply slightly rubbing the surface of the turf by a broomy brush, or the like. The thready pieces of an artificial lawn are, on the contrary, considerably taller in height in comparison with that of natural turf and furthermore bulky in construction. Accordingly, it is very difficult to uniformly fill the scattered sand into the artificial turf spaces merely by slightly rubbing the surface of the turf by using a brush.

Accordingly, in Japanese Patent Application Laid-Open No. 98904/1984 by the same inventor as this application, there has been proposed a device for scattering sand on an artificial lawn and simultaneously uniformly filling the scattered sand into the turf spaces. This device is arranged such that a rotary brush is attached on a truck having a hopper for storing sand at the rear end of the truck with its axis perpendicular to the direction of movement of the truck, and adapted to be forcibly rotated by a motor, or the like. By this device, the turf spaces of the artificial lawn are widened by the rotary brush and suitable vibrations are given to the thready pieces of the artificial lawn, so that the sand discharged from the hopper is effectively substantially uniformly filled in the turf spaces. However, it is necessary to change the urging force of the rotary brush, which is due to the weight of the rotary brush pressing against the artificial lawn, in the case where the thickness of the sand is to be adjusted, or between the initial stage of filling sand to the bottom of the turf spaces and the finishing step of filling sand in the vicinity of the outer surface layer of the artifical lawn. In this device, therefore, a weight is removably attached onto the rotary brush so that the thickness of the sand can be changed by changing the value of this weight. In the case where the thickness of the sand is adjusted by changing the value of the removable weight, it is required to prepare several kinds of weights and it is necessary to change the weight every time the thickness of sand is to be changed. Moreover, there has been a further disadvantage in that the thickness of the sand should be changed depending on the kind of the athletic ground to be constructed and/or the kind of the artificial lawn.

SUMMARY OF THE INVENTION

An object of the present invention is to provide a sand scattering device for an artificial lawn in which the urging force of a rotary brush against the artificial lawn can be easily linearly changed to a desired value.

According to an aspect of the present invention, a sand scattering device for scattering and simultaneously filling sand into turf spaces of an artificial lawn spread over a base comprises a truck having a drive source and adapted to be driven to run on the artificial lawn by the drive source; a hopper mounted on the truck for storing and scattering sand; a rotary brush for filling the artificial lawn with the sand scattered from the hopper, the rotary brush being located behind a scattering position in which the sand discharged from the hopper is scattered onto the artificial lawn; connecting means including a pair of arms for pivotally connecting the rotary brush to the truck; and a rotary brush vertically moving means for vertically moving the rotary brush to control the urging force of the rotary brush against the artificial lawn in cooperation with the connecting means.

According to a preferred embodiment of the present invention, the rotary brush vertically moving means comprises a lift driving source for lifting the rotary brush and a coupling means for connecting the lift driving source and the connecting means at its one and the other end, the coupling means being variable in its length. The lift driving source comprises an oil pressure cylinder, a rack displaceable back and forth by the oil pressure cylinder, a pinion meshed with the rack, a crank lever connected with the pinion so that the rotation of the pinion is converted into swinging motion of the crank lever. The coupling means comprises a turnbuckle which is connected at its one end to the crank lever and at its other end to the connecting means.

In the scattering device for an artificial lawn according to the present invention, the urging force of the rotary brush against the artificial lawn can be extremely easily adjusted by adjusting the rotary brush vertically moving means and therefore the thickness of sand filled in turf spaces can be easily adjusted. Moreover, sand-filling can be rationally performed in accordance with the execution step and the urging force of the rotary brush can be linearly changed.

Other objects, features and advantages of the present invention will be apparent from the following detailed description as to an embodiment illustrated in the accompanying drawings.

DETAILED DESCRIPTION OF PREFERRED EMBODIMENT

Figure 1:
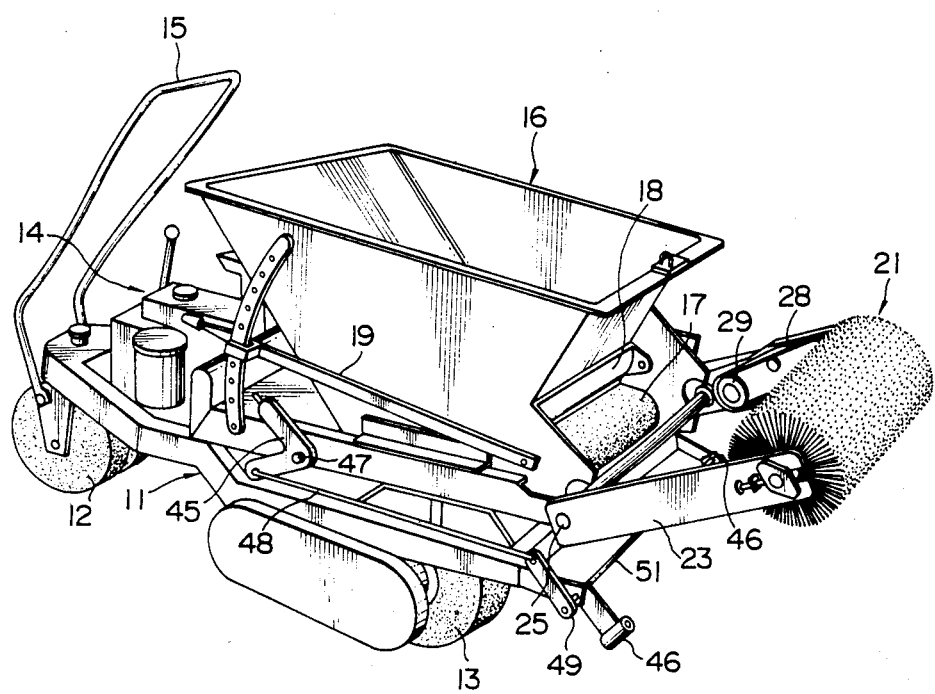
FIG. 1 is a perspective view showing an embodiment of the sand scattering device according to the present invention showing the rotary brush in an inoperative position.

An embodiment illustrated in the drawings according to the present invention will be described hereunder. The sand scattering device is provided with a so-called tricycle type truck 11 having a steering wheel 12 disposed in the front part and a pair of transversely separated rear wheels 13 disposed in the rear part (only one of them is shown in FIG. 1). In this embodiment, an engine 14 is mounted on the truck 11 so that the rear wheels 13 are adapted to be driven by the engine 14 through a known transmission mechanism (not shown). A steering handle 15 for controlling the advancing direction is attached to the steering wheel 12. An electric motor may be used in place of the engine 14.

On the truck 11 is mounted a hopper 16 for storing sand, and under the hopper 16 is provided a belt conveyor 17 for conveying sand discharged from the hopper 16 behind the truck 11 and for scattering the sand over an artificial lawn. The belt conveyer 17 is driven by the engine 14 through a known transmission mechanism (not shown). Further, the hopper 16 has a sand discharge outlet in the form of a slit which is horizontal and perpendicular to the moving direction of the truck, and a shutter member 18 is provided along the sand discharge outlet of the hopper 16 so that the opening degree of the sand discharge outlet can be adjusted by operating the shutter member 18 through a lever 19 disposed outside the hopper 16. A rotary brush 21 is pivotally connected with the rear portion of the truck 11 through a pair of transversely separated arms 22 and 23 such that the rotary brush 21 is held between the respective one ends of the arms 22 and 23 with the rotary axis of the rotary brush 21 perpendicular to the advancing direction of the truck 11. The respective other ends of the arms 22 and 23 are attached to the opposite ends of a support shaft 25, for example, through bearings. The support shaft 25 is horizontally held by a pair of transversely separated bearing members 24 and 24 provided at the rear portion of the truck 11.

Figure 3:
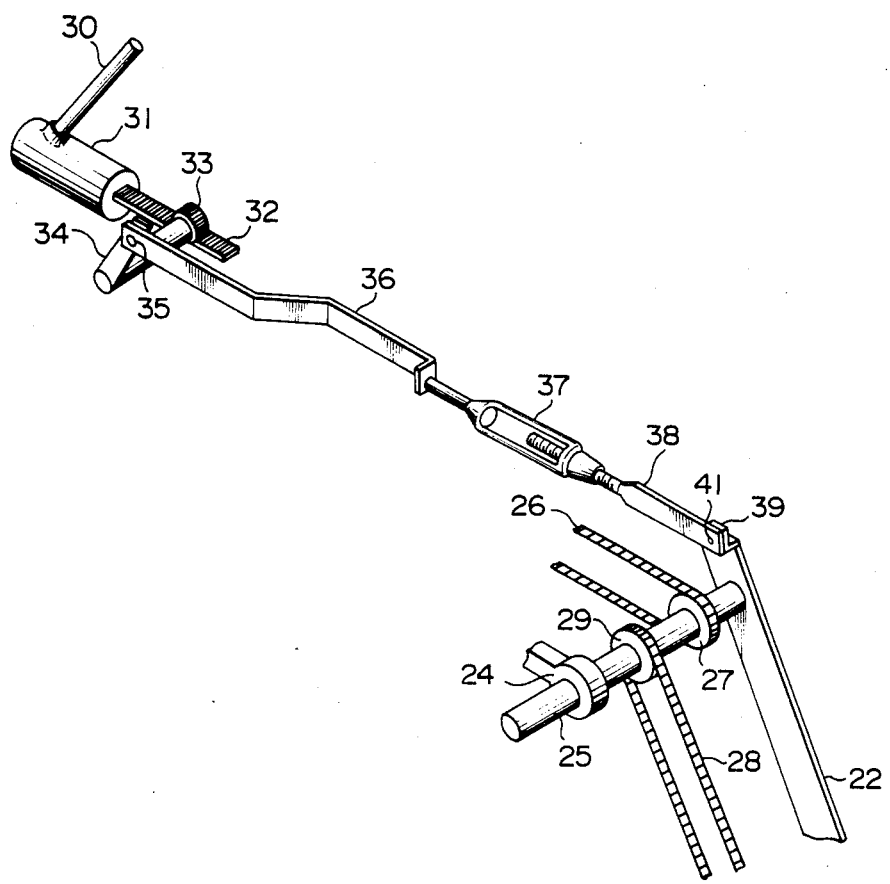
FIG. 3 is a schematic perspective view showing the rotary brush drive means and the rotary brush vertically moving means of the sand scattering device of FIG. 1.

In the sand scattering device, the rotary brush 21 is operatively connected with the engine 14 through a power transmission system. As illustrated in FIG. 3, the power transmission system comprises a sprocket 27 mounted on the support shaft 25 and about which a chain 26 extending from the engine 14 is entrained, and another sprocket 29 mounted on the support shaft 25 for rotating the rotary brush 21 through a chain 28. Thus, the rotary brush 21 is connected with the engine 14 through the chain 28, the sprocket 29, the support shaft 25, the sprocket 27 and the chain 26. Although the support shaft 25 rotates when the rotary brush 21 is rotated, the arms 22 and 23 do not rotate in response to the rotation of the support shaft 25 because a bearing (not shown) is interposed between the other end of each of the arms 22 and 23 and the support shaft 25.

The sand scattering device is provided with a rotary brush vertically moving means comprising a lift driving source and a coupling means for vertically moving the rotary brush 21. In this embodiment, the lift driving source comprises, for example, a manually operated oil pressure cylinder 31 provided in the front portion of the truck 11, a rack 32 connected with a plunger of the oil pressure cylinder 31, a pinion 33 meshed with the rack 32, and a crank lever 34 which swings together with the pinion 33. The coupling means comprises a connecting rod 36 pivotally attached at its one end to the crank lever 34 through a pin 35, a turnbuckle 37 rotatably attached at its one end to the other end of the connecting rod 36 and provided at its other end with a female screw, and a link lever 38 thread-engaged at its one end by the female screw of the turnbukle 37. The link lever 38 is pivotally attached through a pin 41 to an engagement member 39 provided at the upper end of the arm 22.

The operation of the sand scattering device will be now described. First, an actuator lever 30 of the oil pressure cylinder 31 is actuated to displace the rack 32 in the backward direction of the device. The pinion 33 meshed with the rack 32 and the crank lever 34 are swung counterclockwise in FIG. 3. At this time, the connecting rod 36 and the link lever 38 are pulled in the forward direction and therefore a force for causing the arms 22 and 23 to swing up is applied thereto. Accordingly, the rotary brush 21 is lifted up to the inoperative position, as shown in FIG. 1.

Figure 2:
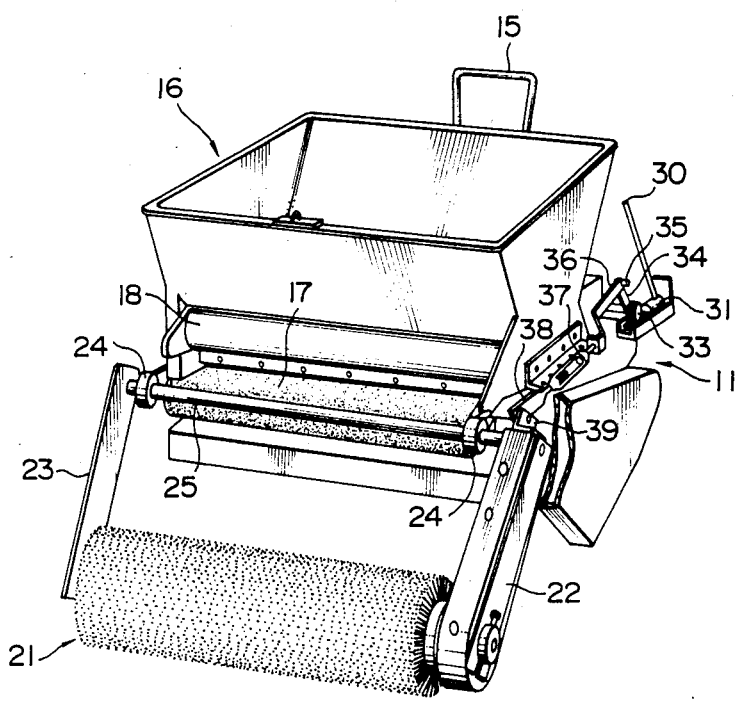
FIG. 2 is a perspective view showing the sand scattering device of FIG. 1 with the rotary brush in an operative position.

In scattering sand 42 into the turf spaces of an artificial lawn 43 comprised of tufts of thready pieces or filaments 44, dry sand 42 is put in the hopper 16. As the sand, it is the most preferable to use silicate mineral particles such as river sand, sea sand, silica sand, or the like, and it is preferable to select the grain size to be a so-called silica sand No. 5-No. 6. Then, the oil pressure in the oil pressure cylinder 31 is released by operating the actuator lever 30, so that the rotary brush 21 descends by its own weight from the inoperative position shown in FIG. 1 and is set at the operative position as shown in FIG. 2. At this time, the urging force due to the weight of the rotary brush 21 is applied to the artificial lawn 43. When the total length of the coupling means is increased by rotating the turnbuckle 37, the urging force applied to the artificial lawn 43 is increased, so that the rotary brush 21 presses more strongly against the thready pieces 44 of artificial lawn 43. On the contrary, in order to decrease the urging force, the lever 30 is actuated so as to cause the oil pressure cylinder 31 to lift slightly the rotary brush 21. Further, the shutter member 18 is operated through the lever 19 so as to appropriately adjust the opening degree of the sand discharge outlet of the hopper 16.

Figure 4:
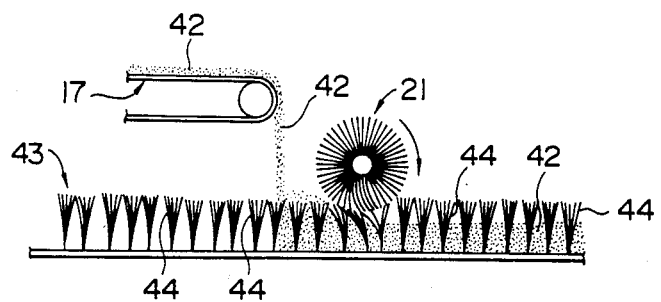
FIG. 4 is a schematic sectional view for explaining the sand filling-up action performed by the rotary brush of FIG. 1.
Figure 5:
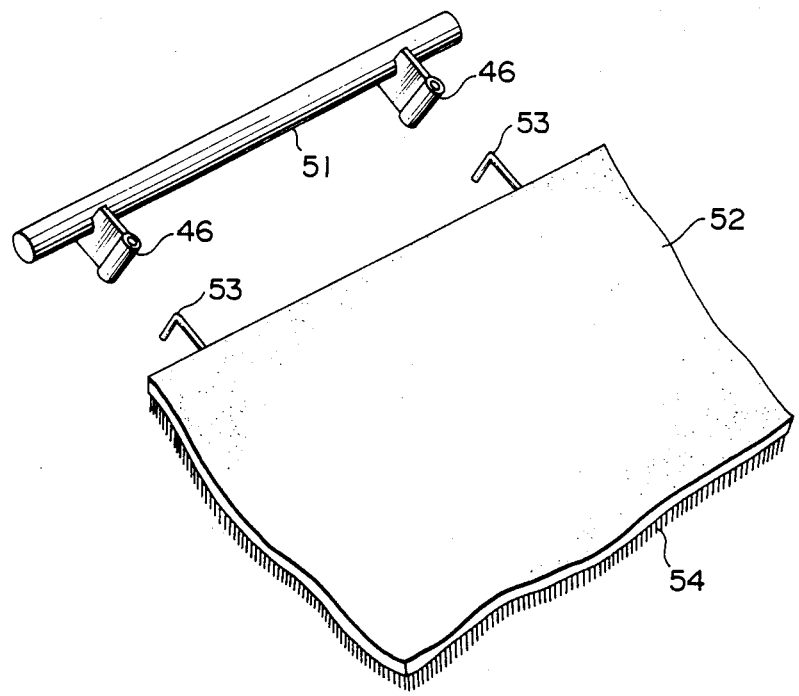
FIG. 5 is a perspective view showing the mat which is provided to the device of FIG. 1, and the arms which engage with the mat.

The belt conveyer and the rotary brush 21 are rotated by the engine 14. Thus, as shown in FIG. 4, the sand 42 stored in the hopper 16 is distributed on the belt conveyor 17 through the discharge outlet and conveyed to the rear portion of the truck 11. Then, the sand is scattered over the artificial lawn 43 and filled in the turf spaces by the trailing rotary brush 21. In this case, the rotary brush 21 may be rotated in either direction, backward or forward, with respect to the advancing direction of the truck 11. That is, assuming that the truck 11 is advanced leftward in FIG. 4, the rotary brush 21 may be rotated in either one of the clockwise and counterclockwise directions. However, it is preferable that the rotary brush 21 be rotated in the clockwise direction as shown in FIG. 4, so as to slant or flex the thready pieces 44 in the advancing direction of the truck 11. When the rotary brush 21 is rotated in a direction so as to slant the respective thready or filaments pieces 44 of the artificial lawn 43 in the advancing direction of the truck 11, the sand 42 scattered from the belt conveyor 17 is effectively filled in the turf spaces, and at the same time, the sand 42 is spread in the advancing direction of the truck 11 and smoothed by the bristles of the rotary brush 21. The thickness of the sand 42 can be adjusted by controlling the urging force of the rotary brush 21 against the artificial lawn 43 in such a manner as described above.

In this embodiment, taking into consideration the case where the urging force against the artificial lawn 43 can not be finely adjusted with respect to the rotary brush 21 in the final finishing stage of the sand filling, at the rear projection of the truck 11 there are provided engagement arms 46 which can be swung by operating one end of a lever 45 as shown in FIG. 1. The lever 45 is bent in the form of hook and pivotally attached at its corner portion onto the truck 11 through a pin 47. A link bar 48 is pivotally attached at its one end to the other end of the lever 45, and also pivotally attached at its other end to one end of a pivotal member 49. The pivotal member 49 is fixed at its other end onto a support shaft 51 rotatably attached onto the truck 11. The support shaft 51 is attached onto the truck 11 and extends substantially parallel to the shaft 25 of the rotary brush 21. A brushy mat 52 is hung from the engagement arms 46 by hooks 53 so as to make it possible to perform land-leveling while dragging a brush surface 54 thereof. At this time, the rotary brush 21 is lifted up to the inoperative position by the oil pressure cylinder 31, as shown in FIG. 1.

The specific embodiment according to the present invention has been illustrated and described, but it will be apparent to those skilled in the art that various modifications in the shape and arrangement of parts can be made without departing from the spirit and scope of the present invention.

What is claimed is:

1. A device for scattering and evenly packing sand into turf spaces between tufts of filaments of an artificial lawn spread over a base, the device comprising: a truck powered by a drive source for riding over the artificial lawn; a hopper mounted on the truck for storing sand, the hopper having a discharge outlet for discharging sand from the hopper, and regulating means for regulating the quantity of sand discharged through the discharge outlet; conveying means disposed on the truck and extending beneath the hopper discharge outlet for receiving thereon the sand discharged through the discharge outlet and conveying the sand rearwardly in a direction opposite to the advancing direction of the truck and scattering the sand over the artificial lawn; a rotary brush rotationally driven by the drive source and connected to the truck to trail behind the conveying means for brushing the scattered sand into the turf spaces of the artificial lawn; and means for adjustably setting the pressure at which the rotary brush presses against the artificial lawn to thereby enable the rotary brush to evenly pack the sand into the turf spaces.

2. A device according to claim 1; wherein the means for adjustably setting the pressure comprises connecting means connecting the rotary brush to the truck to enable the rotary brush to undergo vertical movement relative to the truck, and moving means for vertically moving the rotary brush to thereby adjustably set the pressure at which the rotary brush presses against the artificial lawn.

3. A device according to claim 2; wherein the connecting means includes means connecting the rotary brush to undergo vertical swinging movement relative to the truck.

4. A device according to claim 2; including means for rotationally driving the rotary brush in a direction of rotation effective to cause the rotating brush to flex the tufts of filaments in the advancing direction of the truck.

5. A device according to claim 4; wherein the connecting means includes means connecting the rotary brush to undergo vertical swinging movement relative to the truck.

6. A device according to claim 1; including means for rotationally driving the rotary brush in a direction of rotation effective to cause the rotating brush to flex the tufts of filaments in the advancing direction of the truck.

7. A device according to claim 2; wherein the moving means includes a set of threadedly engaged members rotatable relative to one another in forward and reverse directions to accordingly adjust the pressure at which the rotary brush presses against the artificial lawn.

8. A sand scattering device for scattering and simultaneously filling sand into turf spaces of an artificial lawn comprised of tufts of thready pieces spread over a base, comprising:
a truck having a drive source and operable to be driven to run on said artificial lawn by said drive source;
a hopper mounted on said truck for storing sand, said hopper having a sand discharge outlet of slit form which is horizontal and perpendicular to the moving direction of said truck, and a shutter member disposed along the outlet and operable to adjust the opening degree of said discharge outlet;
a lever mounted outside said hopper and connected to operate said shutter member so as to adjust the opening degree of said discharge outlet;
a belt conveyor disposed on said truck and under said hopper for scattering sand discharged through said discharge outlet from said hopper over said artificial lawn, said belt conveyor cooperating with said shutter member to uniformly distribute the sand behind said truck;
a rotary brush rotationally driven by said drive source for filling said artificial lawn with the sand scattered from said belt conveyer, said rotary brush being located behind a scattering position in which the sand discharged on said belt conveyor is scattered onto said artificial lawn, the rotary axis of said rotary brush being perpendicular to the moving direction of said truck;
connecting means including a pair of arms for pivotally connecting said rotary brush to said truck; and
a rotary brush vertically moving means for vertically moving said rotary brush to control the urging force of said rotary brush against said artificial lawn in cooperation with said connecting means.

9. A sand scattering device according to claim 8; including means for rotating said rotary brush in a direction such that the thready pieces of said artificial lawn are forcedly slanted in the advancing direction of said truck.

10. A sand scattering device according to claim 8; wherein said rotary brush vertically moving means comprises a lift driving source for lifting said rotary brush, and coupling means for coupling said lift driving source and said connecting means, said coupling means being variable in its length.

11. A sand scattering device according to claim 10; wherein said lift driving source comprises an oil pressure cylinder, a rack connected to be moved by said oil pressure cylinder, a pinion rotatably meshed with said rack, and a crank lever connected with said pinion so that the rotation of said pinion is converted into a swinging motion of the crank lever; and wherein said coupling means comprises a turnbuckle pivotally connected at its one end to said crank lever and at its other end to the one end of one of said pair of arms so that the total length of said coupling means can be varied by rotating said turnbuckle.

12. A sand scattering device according to claim 9; wherein said rotary brush vertically moving means comprises a lift driving source for lifting said rotary brush, and coupling means for coupling said lift driving source and said rotary brush connecting means, said coupling means being variable in its length.

13. A sand scattering device according to claim 12; wherein said lift driving source comprises an oil pressure cylinder, a rack connected to be moved by said oil pressure cylinder, a pinion rotatably meshed with said rack, and a crank lever connected with said pinion so that the rotation of said pinion is converted into a swinging motion of the crank lever; and wherein said coupling means comprises a turnbuckle pivotally connected at its one end to said crank lever and at its other end to the one end of one of said pair of arms, so that the total length of said coupling means can be varied by rotating said turnbuckle.

* * * * *